June 15, 1926.
T. E. MURRAY
SHAFT
Filed Feb. 7, 1923
1,588,850
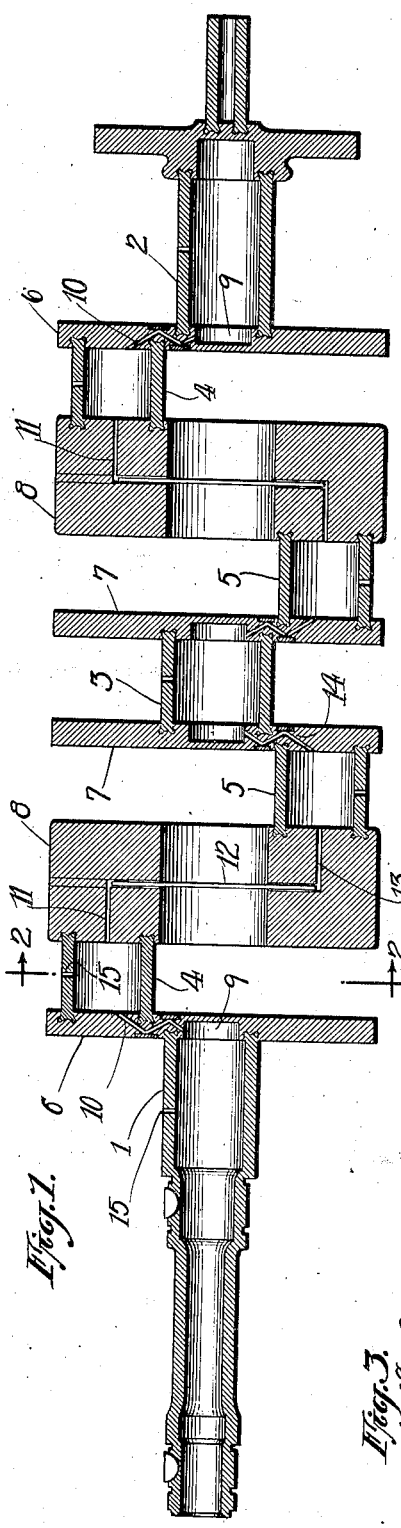
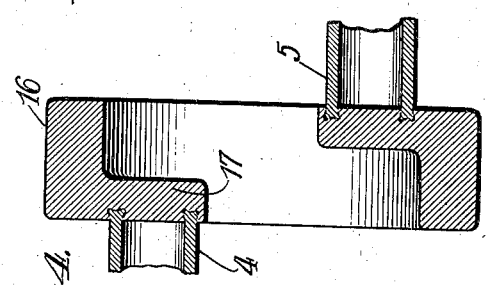
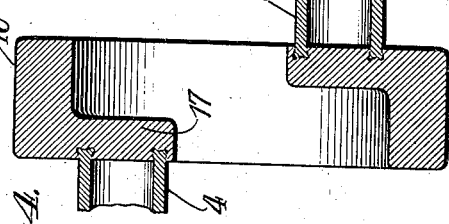
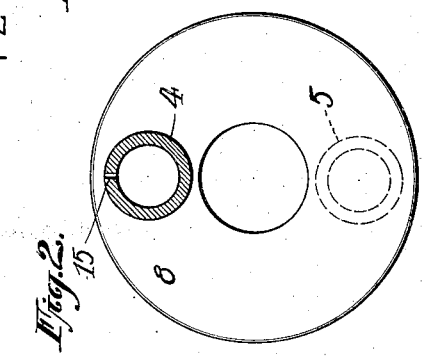
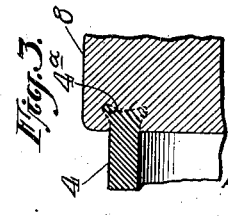
INVENTOR
Thomas E. Murray.
BY
ATTORNEY Patented June 15, 1926.

1,588,850

UNITED STATES PATENT OFFICE.

THOMAS E. MURRAY, OF BROOKLYN, NEW YORK.

SHAFT.

Application filed February 7, 1923. Serial No. 617,652.

In the application of myself and Thomas E. Murray, Jr. No. 573,558, filed July 8, 1922 there is described a method of producing crank shafts, cam shafts and similar shafts having offset portions by which they were economically made of sheet metal segments bent transversely and welded together in certain ways so as to produce a good shaft economically. The present invention provides certain improvements applicable to the same class of work and designed to produce a superior shaft.

The accompanying drawings illustrate an embodiment of the invention.

Fig. 1 is a longitudinal section of a crank shaft for a four cylinder automobile engine;

Fig. 2 is a cross-section of the same on the line 2—2;

Fig. 3 is a detail of a joint, on an enlarged scale;

Fig. 4 is a longitudinal section and Fig. 5 a transverse section, similar to Fig. 2, illustrating a modification.

The shaft in this case is made up of a number of tubular bearing members connected to each other by means of discs which serve the additional function of fly wheels. The bearing ends 1 and 2 are tubular pieces forged or turned out of hollow material or otherwise formed to give the desired properties.

The central bearing portion 3 and the crank pins 4 and 5 are of similar tubular material. Instead of the ordinary crank arms from the bearing ends 1 and 2 of the shaft solid discs 6 are mounted centrally thereon and are connected at eccentric portions of their opposite faces to the crank pins 4. Similar discs 7 are mounted on opposite ends of the center bearing portion 3 of the shaft and are connected at eccentric points of their faces to the crank pins 5.

Instead of the usual crank arms between the pins 4 and 5 I provide rings 8 (or they may be discs) corresponding in thickness to the space between the crank pins 4 and 5. These may be hollow pressed or forged pieces or solid rings welded together, or may be produced in various ways. Each of them is united at eccentric points on its opposite faces to the successive crank pins 4 and 5.

The discs 6 are provided with recesses 9 in their outer faces communicating with the hollow centers of the bearing members 1 and 2 and connected by oil passages 10 with the hollow centers of the crank pins 4. The latter in turn communicate with oil holes 11 drilled in the rings 8 and communicating by pipes 12 with similar oil holes 13 leading to the hollow centers of the crank pins 5; these in turn communicating by way of oil passages 14 in the discs 7 with the central bearing member 3. The several bearing members and crank pins are provided with oil holes as indicated at 15. The arrangement of passages illustrated permits the forcing of oil for all the bearings through the open end of the member 1. Various other means of passing oil from one bearing to another may be provided.

The shaft thus built up is composed of a number of parts united by joints transverse to the length of the shaft and these joints are preferably electrically welded and inset in accordance with a method described in a previous specification. The ends of the tubular parts 1, 2, 4 and 5 are entered in annular grooves in the faces of the several discs or rings. The grooves are expanded or undercut at the bottom. The parts to be united are pressed together in the direction of the axis of the tube and welded by the passage of a current of electricity therethrough. The softening of the metal and the shape of the groove produces an expansion of the ends of the tubes into the undercut portions of the grooves as indicated at 4ª (Fig. 3) which gives a mechanical locking of the parts together in addition to the weld which fastens them and also makes a tight joint through which oil can not escape.

The parts may be all assembled and then welded together at one operation in the manner described; or the separate joints may be made in separate operations. When the welding is completed the shaft is practically perfect and requires little or none of the ordinary expensive manipulation of turning and grinding. Perfect alignment of the parts is easily assured in the making of the parts and maintained during the welding operations.

Where space permits the rings 8 (and the discs 6 and 7 also, if desired) may be made of greater diameter so as to secure a greater fly wheel effect. For example, in Figs. 4 and 5 I have shown a ring 16 which extends out considerably beyond the crank pins 4 and 5, being welded to the end of the latter by means of internal flanges or ears 17.

In certain previous Patents Nos. 1,223,089 and 1,223,090 of April 17, 1917 I have described the making of shafts of sections struck up from sheet metal and welded together end to end, and the attachment of cranks thereto. But the crank pins or bearing members according to the aforesaid patents were not the integral tubular pieces of the shaft ring illustrated running continuously from one crank arm or circular member to the next. The bearing members of the present crank may be forgings or sections of seamless tubing or may be made of various other ways so as to be integral and uniform from end to end and entirely open for the free passage of oil and to provide a better outer bearing surface as well as a stronger pin than could be obtained according to said prior patents. Furthermore, the entering of one of the parts into a recess in the other, and specifically the entering of the ends of the tubular bearing members into recesses in the circular members or crank portions provides a very stiff joint of greater strength than could be obtained by a simple butt weld.

Though I have described with great particularity of detail certain embodiments of my invention yet it is not to be understood therefrom that the invention is restricted to the particular embodiments disclosed. Various modifications thereof in detail and in the arrangement of the parts may be made by those skilled in the art without departing from the invention as defined in the following claims.

What I claim is:—

1. A crank shaft or the like including tubular bearing members and crank portions, the former entering annular recesses in the latter of less depth than the thickness of the crank portions and fitting the annular ends of the tubular bearing members and being butt-welded thereto.

2. A crank shaft or the like including tubular bearing members and crank portions consisting of solid forgings with recessed centers and having in their outer portions annular recesses of less depth than their thickness, said bearing members fitting and entering the annular recesses in the outer portions of the crank members and having their ends butt-welded to the bottoms of such recesses.

3. A crank shaft or the like including tubular bearing members and crank portions, the former entering annular recesses in the latter of less depth than the thickness of the crank portions and fitting the annular ends of the tubular bearing members and being butt-welded thereto, said crank portions having oil passages communicating with the open ends of the tubular bearing members.

In witness whereof, I have hereunto signed my name.

THOMAS E. MURRAY.